(12) United States Patent
Mccullough et al.

(10) Patent No.: US 10,328,925 B2
(45) Date of Patent: Jun. 25, 2019

(54) SYSTEM AND METHOD FOR CONTROLLING LASH CROSSING IN A VEHICLE POWERTRAIN

(71) Applicant: Ford Global Technologies, LLC, Dearborn, MI (US)

(72) Inventors: Todd Mccullough, Bloomfield Hills, MI (US); David Crist Gabriel, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

(21) Appl. No.: 15/434,588

(22) Filed: Feb. 16, 2017

(65) Prior Publication Data

US 2018/0229714 A1 Aug. 16, 2018

(51) Int. Cl.

| B60W 30/20 | (2006.01) |
|---|---|
| B60W 10/02 | (2006.01) |
| B60W 10/06 | (2006.01) |
| B60W 10/08 | (2006.01) |
| B60W 30/18 | (2012.01) |
| B60W 20/15 | (2016.01) |
| B60K 6/48 | (2007.10) |
| B60K 6/387 | (2007.10) |

(Continued)

(52) U.S. Cl.
CPC .......... *B60W 20/15* (2016.01); *B60K 6/387* (2013.01); *B60K 6/48* (2013.01); *B60K 6/547* (2013.01); *B60W 10/02* (2013.01); *B60W 10/06* (2013.01); *B60W 10/08* (2013.01); *B60W 20/40* (2013.01); *B60W 30/18072* (2013.01); *B60W 30/20* (2013.01); *B60K 2006/4825* (2013.01); *B60W 2030/1809* (2013.01); *B60W 2030/18081* (2013.01); *B60W 2030/206* (2013.01); *B60W 2510/081* (2013.01); *B60W 2520/30* (2013.01); *B60W 2540/10* (2013.01); *B60W 2540/103* (2013.01); *B60W 2710/021* (2013.01); *B60W 2710/0644* (2013.01); *B60W 2710/083* (2013.01); *B60Y 2200/92* (2013.01); *Y02T 10/56* (2013.01); *Y02T 10/6221* (2013.01); *Y02T 10/6286* (2013.01); *Y10S 903/93* (2013.01)

(58) Field of Classification Search
CPC ...... B60W 30/20; B60W 10/08; B60W 10/06; B60W 10/02; B60W 2030/1809; B60W 20/00; B60W 30/18072
See application file for complete search history.

(56) References Cited

U.S. PATENT DOCUMENTS

| 8,628,450 B2 * | 1/2014 | Miyazaki ................. B60K 6/48 477/5 |
|---|---|---|
| 8,645,013 B2 | 2/2014 | Sah et al. |

(Continued)

FOREIGN PATENT DOCUMENTS

JP    2012158327 A  *  8/2012

*Primary Examiner* — Sherry L Estremsky
(74) *Attorney, Agent, or Firm* — David B. Kelley; Brooks Kushman P.C.

(57) ABSTRACT

A vehicle is disclosed having a motor and engine selectively coupled to the motor via a clutch. The vehicle includes a controller configured to, in response to a vehicle wheel torque reversal, open the clutch to disconnect the engine from the motor, command the engine to enter a speed control mode, and control a motor output torque through a region surrounding the vehicle wheel torque reversal to reduce torque disturbances in a vehicle driveline.

18 Claims, 4 Drawing Sheets

(51) Int. Cl.
*B60K 6/547* (2007.10)
*B60W 20/40* (2016.01)

(56) References Cited

U.S. PATENT DOCUMENTS

| | | | |
|---|---|---|---|
| 8,808,140 B2 * | 8/2014 | Reed | B60W 10/02 |
| | | | 477/5 |
| 8,954,215 B2 | 2/2015 | Yamazaki et al. | |
| 10,106,145 B2 * | 10/2018 | Reed | B60W 20/15 |
| 2013/0297110 A1 * | 11/2013 | Nefcy | B60L 15/20 |
| | | | 701/22 |
| 2013/0297111 A1 * | 11/2013 | Yamazaki | B60W 20/00 |
| | | | 701/22 |
| 2016/0102757 A1 | 4/2016 | Ye et al. | |
| 2018/0072306 A1 * | 3/2018 | Yamazaki | B60W 20/15 |

* cited by examiner

SYSTEM AND METHOD FOR CONTROLLING LASH CROSSING IN A VEHICLE POWERTRAIN

TECHNICAL FIELD

The present disclosure relates to a system and method for control of driveline lash in a hybrid vehicle.

BACKGROUND

In a vehicle, drivability may be a concern when vehicle torque crosses a lash zone. A lash zone results when the vehicle torque changes direction, i.e. from positive torque to negative torque, or vice versa. Lash, or backlash, may occur for example due to lost motion caused by slack or clearance within various driveline components when torque changes direction, such as during a vehicle acceleration or deceleration event. When the powertrain transitions from exerting positive torque to exerting negative torque, the gears in the transmission/driveline separate at a zero torque transition point. After passing through the zero torque point, the gears reengage to allow transfer torque. This produces torque disturbances, or lash, in the driveline. Lash may produce a clunk noise or bump that is perceivable to a vehicle occupant. Lash contributes to noise, vibration, and harshness that degrades drivability of a vehicle using the powertrain.

SUMMARY

According to embodiments of the present disclosure, a strategy for crossing a lash zone using motor torque is provided. In general, when a lash crossing event is anticipated, the engine is disconnected from the driveline and placed in a speed control mode, while motor torque is used to cross the lash zone and reduce driveline disturbances.

In one embodiment, a vehicle is disclosed having a motor and an engine selectively coupled to the motor via a clutch. The vehicle includes a controller configured to, in response to a vehicle wheel torque reversal, open the clutch to disconnect the engine from the motor, command the engine to operate in a speed control mode, and control a motor output torque through a region surrounding the vehicle wheel torque reversal to reduce torque disturbances in a vehicle driveline. The vehicle wheel torque reversal may be triggered by an accelerator pedal tip out. The controller is further configured to close the clutch to connect the engine to the motor responsive to a powertrain torque being outside the region surrounding the vehicle wheel torque reversal. Moreover, operation in the speed control mode includes controlling an engine speed to match that of a motor speed.

In another embodiment, a control system for a vehicle having an engine selectively coupled to a motor via a clutch is disclosed. The control system includes a controller configured to, in response to a vehicle wheel torque reversal, disengage the clutch to disconnect the engine from the motor, operate the engine in a sailing mode, and modulate motor torque according to a predefined rate of change through a lash region surrounding the vehicle wheel torque reversal to reduce torque disturbances in a driveline. The torque disturbances include lash in gear meshes of the driveline. The vehicle wheel torque reversal may be from positive to negative and triggered by an accelerator pedal tip out. The controller is further configured to reengage the clutch to couple the engine with the motor responsive to a powertrain torque being outside the lash region. Moreover, operating the engine in a sailing mode may include controlling the engine to rotate at a speed equal to a motor speed.

In yet another embodiment, a method for controlling a vehicle having an engine selectively coupled to a motor via a clutch is disclosed. In response to a vehicle wheel torque reversal, the method includes disengaging the clutch to disconnect the engine from the motor, controlling the engine to operate in a speed control mode, and controlling motor torque to reduce a powertrain torque at a predefined rate through a lash region surrounding the vehicle wheel torque reversal to reduce torque disturbances in a vehicle driveline. Additionally, operation in the speed control mode includes controlling an engine speed to match that of a motor speed. The method may further include commanding the engine to exit the speed control mode responsive to the powertrain torque being outside the lash region.

Embodiments according to the present disclosure provide a number of advantages such as faster and more controlled lash crossings due to isolation of engine torque inaccuracies and the superior torque accuracy of the electric machine. When the engine is disconnected, the lash uncertainty region becomes smaller because the electric machine has torque accuracy superior to an engine. Since the window for potential torque error is smaller, the powertrain torque can be delivered smoother and quicker. This results in improved drivability and vehicle performance.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
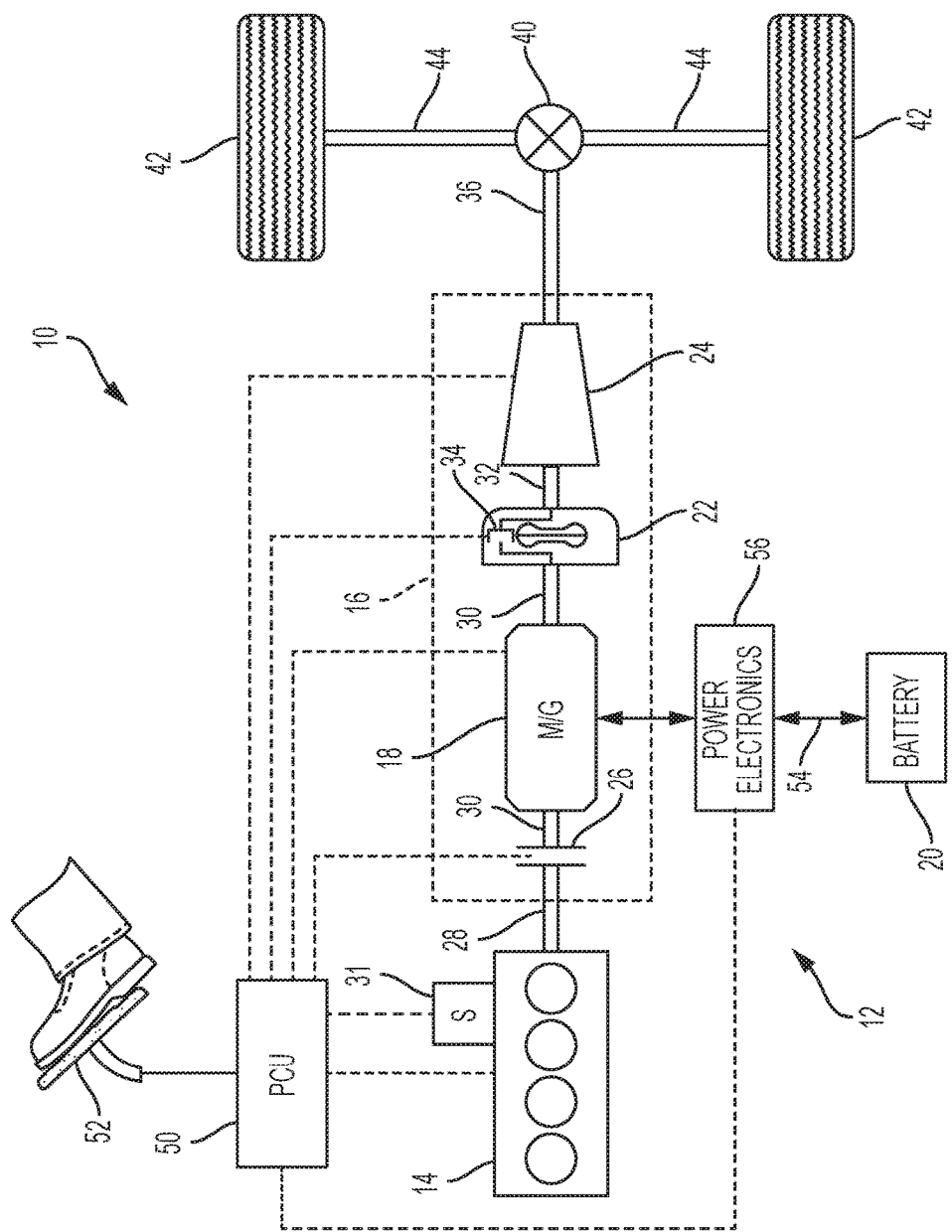
FIG. 1 is a schematic representation of a hybrid vehicle capable of implementing embodiments described herein.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The engine 14, M/G 18, torque converter 22, and the automatic transmission 16 are connected sequentially in series, as illustrated in FIG. 1.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The disconnect clutch 26 may be engaged (closed) or disengaged (opened) when crossing a lash zone during an accelerator tip in or tip out event. The lash zone is when the vehicle torque changes direction, i.e. from positive torque to negative torque, or vice versa. Lash, or backlash, may occur for example due to lost motion caused by slack or clearance within various driveline components when the vehicle torque changes direction, such as during a driver tip in or tip out event. When the powertrain transitions from exerting positive torque to exerting negative torque, the gears in the transmission/driveline separate at a zero torque transition point. After passing through the zero torque point, the gears reengage to allow transfer torque. This produces torque disturbances, or lash, in the driveline. Lash may produce a clunk noise or bump that is perceivable to a vehicle occupant. Lash contributes to noise, vibration, and harshness that degrades drivability of a vehicle using the powertrain. The drivability and control of lash within the driveline depends on the control of the powertrain torque from the engine 12 and/or the electric machine (M/G) 14.

A separate starter motor 31 can be selectively engaged with the engine 14 to rotate the engine to allow combustion to begin. Once the engine 14 is started, the starter motor 31 can be disengaged from the engine via, for example, a clutch (not shown) between the starter motor 31 and the engine 14. In one embodiment, the engine 14 is started by the starter motor 31 while the disconnect clutch 26 is open, keeping the engine 14 disconnected with the M/G 18. The disconnect clutch 26 can couple the engine 14 to the M/G 18 to allow the engine 14 to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping, operating M/G 18 to provide wheel torque or charge battery 20, operating M/G 18 to control powertrain torque and/or engine 14 to control powertrain torque during a lash crossing event, selecting or scheduling transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation under various conditions such as crossing a lash zone, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

In a hybrid vehicle, braking is often performed by the powertrain instead of friction brakes. Regenerative braking allows the vehicle to capture kinetic energy used to slow the vehicle and store it in a high voltage battery. During a regenerative braking event, there is a potential for poor drivability due to gear lash. Lash may be an oscillation in the driveline that occurs when there is a vehicle wheel torque reversal. When the powertrain transitions from exerting positive torque to exerting negative torque, the gears in the transmission/driveline separate at a zero torque transition point. After passing through the zero torque point, the gears reengage to allow transfer torque. The powertrain torque must be carefully managed to prevent clunks and other noise-vibration-and-harshness (NVH) issues at reengagement.

Figure 2:
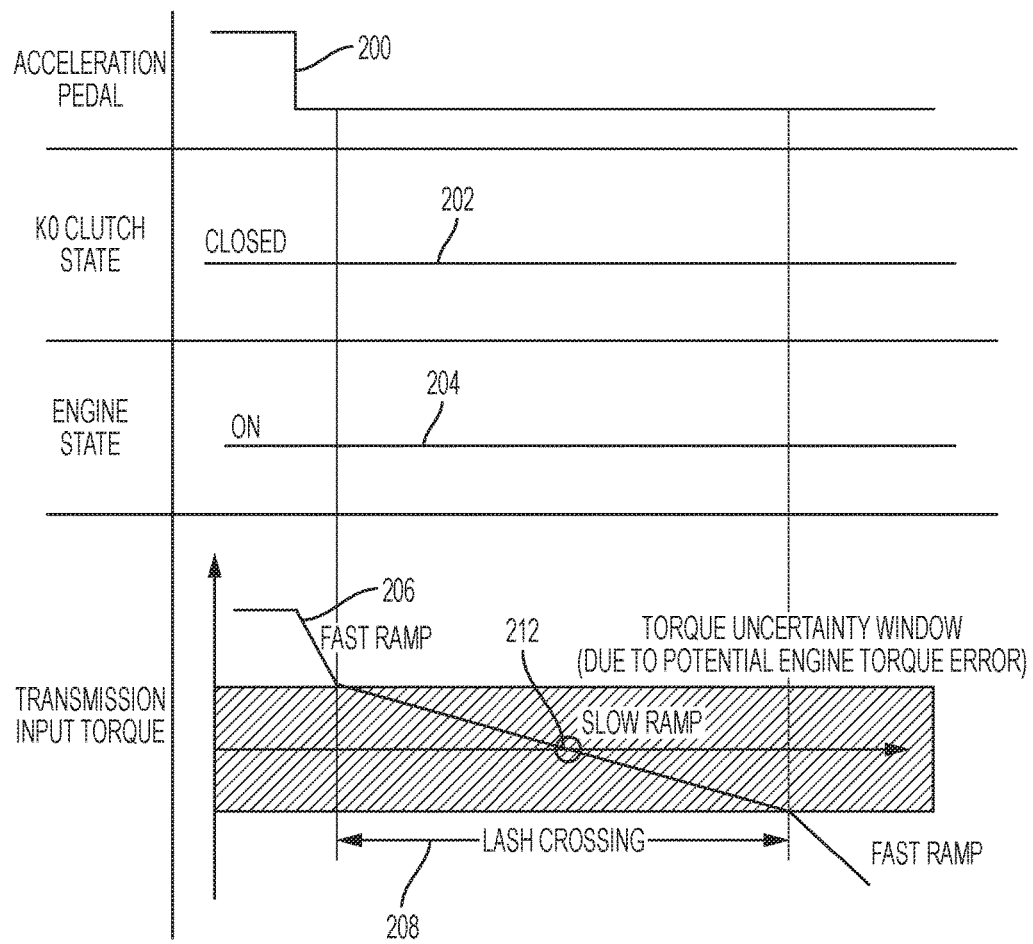
FIG. 2 is a representative graph illustrating a prior art lash crossing strategy using engine torque.

Referring to FIG. 2, a graph of a prior art lash crossing strategy using engine torque is shown. In particular, engine torque is used to control the ramp rate and shape of the powertrain torque to minimize driveline disturbances. As shown in FIG. 2, accelerator pedal tip-out occurs at 200, which indicates that a lash crossing event 212 is about to occur (i.e., input torque on the driveline transitions from a positive to negative value). During the lash crossing event 212, the disconnect clutch (K0 Clutch) remains closed 202 and the engine is on 204. Moreover, a lash crossing window, or torque uncertainty region, 208 is determined so that the powertrain torque (or transmission input torque) 206 can be carefully managed to reduce NVH. However, due to inaccuracies in engine torque estimates, the powertrain torque must to be slowly ramped from far on the positive side of lash to far on the negative side of lash. This ensures that if the torque estimate is incorrect, the lash crossing will still be controlled. The drawback of crossing a lash zone using this strategy is an increase in the duration of the lash crossing event, which negatively affects drivability.

In contrast to the prior art strategy described with reference to FIG. 2, embodiments of the present disclosure provide improved systems and methods for crossing a lash zone using motor torque. In general, when a lash event is anticipated, the engine is disconnected from the rest of the driveline via the disconnect clutch (K0 clutch) and controlled to operate in a speed control mode. The electric machine or motor is then used to cross the lash zone. The superior torque accuracy of the motor allows the lash crossing to be performed quickly and smoothly. As mentioned above, the engine is placed in a speed control mode and is commanded to follow motor speed. Once the lash crossing event is completed, the engine is reconnected if desired. Embodiments using this strategy will allow for faster and more controlled lash crossings due to isolation of engine torque inaccuracies and the superior torque accuracy of the high voltage electric machine. This will result in improved drivability and overall vehicle performance.

Figure 3:
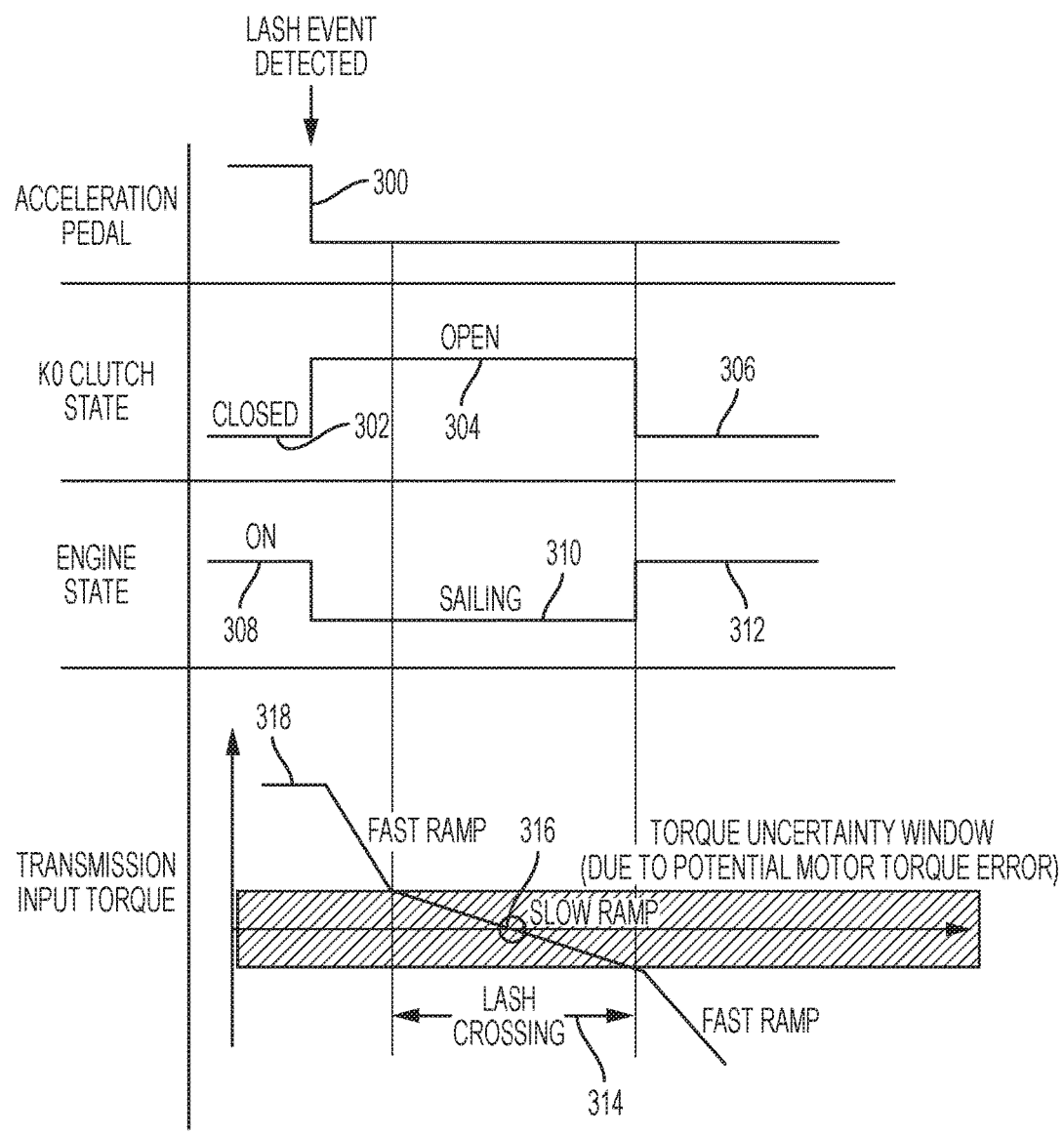
FIG. 3 is a representative graph illustrating a lash crossing strategy using motor torque in accordance with embodiments described herein.

Referring to FIG. 3, a graph illustrating a lash crossing strategy using motor torque in accordance with embodiments described herein is provided. As shown in FIG. 3, a lash crossing event 316 (i.e., a vehicle torque reversal event where input torque on the driveline transitions from a positive to negative value) is detected or anticipated from accelerator tip-out at 300. A lash uncertainty region/window 314 is predetermined based on characteristics of the electric motor. The characteristic of the motor that allows for a smaller torque uncertainty window 314 is the accuracy of torque delivery. The electric motor can more accurately deliver the commanded torque than an internal combustion engine can, therefore, the motor requires a smaller uncertainty window 314 than the engine. The uncertainty window 314 is a range of torque about the lash point 316 in which the absolute delivered torque of the powertrain component cannot be accurately known. The size of the uncertainty window 314 is determined by knowing the measured accuracy of the powertrain component. For example, if the powertrain component, such as the motor, can deliver torque within +/−10 Nm of the commanded value, then the torque uncertainty window for that component is +/−10 Nm. Torque accuracy can also be stated as a percentage of maximum torque. For example, if a powertrain component is capable of delivering a maximum torque of 200 Nm and the torque accuracy is stated as 10%, then the uncertainty window for that component is +/−20 Nm.

With continual reference to FIG. 3, the motor torque is used to control the shape and ramp rate of the powertrain torque (or transmission input torque) 318. The powertrain torque 318 is reduced at a predetermined rate of change within the lash uncertainty window 314. Additionally, the disconnect clutch (K0 clutch) is opened 304 to isolate the engine from the rest of the driveline during the lash crossing, or vehicle wheel torque reversal, event 316. The engine is placed in speed control, or sailing mode, 310 and the lash crossing event 316 is performed using only the electric motor. Due to the motor's superior torque accuracy, the lash crossing can be performed smoother and quicker, which improves drivability and overall vehicle performance. When the lash crossing event 316 is complete, the engine may be reconnected 306 (i.e., disconnect clutch is closed) if desired and taken out of speed control mode as shown at 312 depending on driver demand and the vehicle's normal operating strategy.

Figure 4:
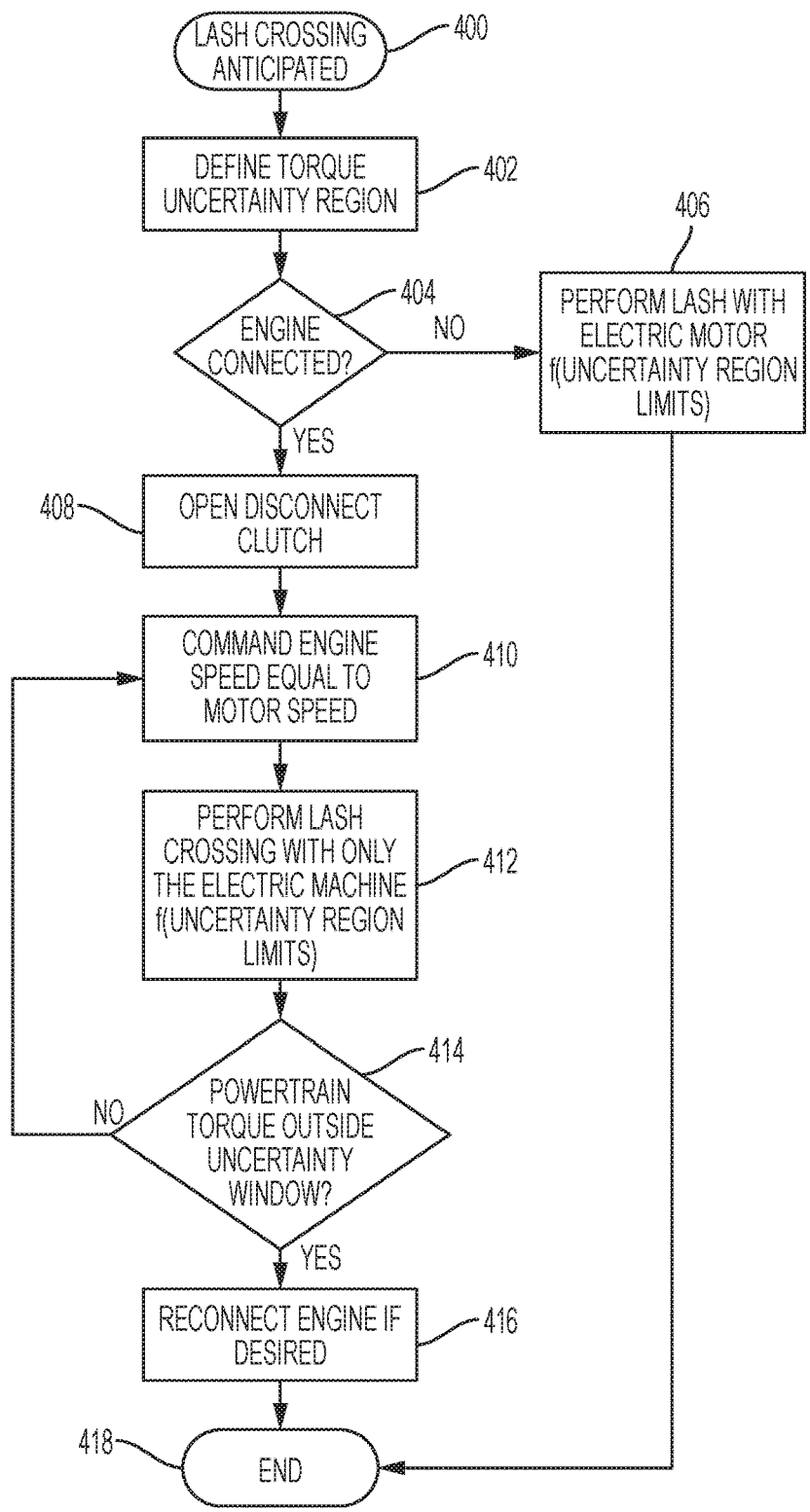
FIG. 4 illustrates a flow chart describing a lash crossing strategy using motor torque in accordance with embodiments described herein.

Referring to FIG. 4, a flow chart is provided that describes a strategy for crossing a lash zone using motor torque in accordance with embodiments described herein. The vehicle control system initiates the control strategy when a lash crossing, or vehicle wheel torque reversal, event is anticipated, as shown at step 400. Accelerator pedal position, or the like, may be used as the input to trigger the strategy (see, e.g., FIG. 3). For example, driver tip out to zero percent pedal position may be an indication that powertrain torque will transition from a positive value to a negative value and can be used to initiate the strategy shown in FIG. 4.

At step 402, a lash uncertainty region or window is predetermined based on characteristics of the electric motor. If the engine is disconnected from the driveline at step 404, lash crossing is performed using the motor as shown at step 406. This means that motor torque is used to control the shape and ramp rate of the powertrain torque. Powertrain torque is reduced or ramped down at a predetermined rate of change through the lash uncertainty region (this was shown in reference to FIG. 3). If the engine is connected at step 404 when a lash event is anticipated, the disconnect clutch is opened at step 408 to isolate the engine from the rest of the driveline. At step 410, the engine is placed in speed control or sailing mode where the engine is commanded to follow the motor speed (i.e., engine speed is equal to motor speed). The lash crossing is then performed using only the electric motor as shown at step 412 where motor torque controls the shape and ramp rate of the powertrain torque during the lash event. The vehicle control system then determines at step 414 if the powertrain torque is outside the lash uncertainty window previously determined at step 402. If the powertrain torque is not outside the lash uncertainty window, then steps 410-414 are performed until the powertrain torque is outside the lash uncertainty window. Once the powertrain torque is outside the lash uncertainty window at step 414 (i.e., the lash crossing event is completed), then the vehicle control system reconnects the engine, or closes the clutch, if so desired at step 416 dependent on driver demand and the vehicle's normal operating strategy. The control strategy ends at step 418. As explained above, the lash crossing can be performed smoother and quicker due to the motor's superior torque accuracy using the embodiments described above.

Embodiments according to the present disclosure provide a number of advantages such as faster and more controlled lash crossings due to isolation of engine torque inaccuracies and the superior torque accuracy of the high voltage electric machine. When the engine is disconnected, the lash uncertainty region becomes smaller because the electric machine has torque accuracy superior to an engine. Since the window for potential torque error is smaller, the powertrain torque can be delivered smoother and quicker. This results in improved drivability and vehicle performance.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle, comprising:
   a motor;
   an engine selectively coupled to the motor via a clutch; and
   a controller configured to, in response to a vehicle wheel torque reversal, open the clutch to disconnect the engine from the motor, command the engine to operate in a speed control mode, and control a motor output torque through a region surrounding the vehicle wheel torque reversal to reduce torque disturbances in a vehicle driveline.

2. The vehicle of claim 1, wherein the vehicle wheel torque reversal is triggered by an accelerator pedal tip out.

3. The vehicle of claim 1, wherein the region surrounding the vehicle wheel torque reversal is determined from motor operating parameters.

4. The vehicle of claim 1, wherein the controller is further configured to close the clutch to connect the engine to the motor responsive to a powertrain torque being outside the region surrounding the vehicle wheel torque reversal.

5. The vehicle of claim 1, wherein operation in the speed control mode includes controlling an engine speed to match that of a motor speed.

6. The vehicle of claim 1, wherein the controller is further configured to command the engine to exit the speed control mode responsive to a powertrain torque being outside the region surrounding the vehicle wheel torque reversal.

7. A control system for a vehicle having an engine selectively coupled to a motor via a clutch, comprising:

a controller configured to, in response to a vehicle wheel torque reversal, disengage the clutch to disconnect the engine from the motor, operate the engine in a sailing mode, and modulate motor torque according to a predefined rate of change through a lash region surrounding the vehicle wheel torque reversal to reduce torque disturbances in a driveline.

8. The control system of claim 7, wherein the torque disturbances include lash in gear meshes of the driveline.

9. The control system of claim 7, wherein the vehicle wheel torque reversal is from positive to negative and triggered by an accelerator pedal tip out.

10. The control system of claim 7, wherein the controller is further configured to reengage the clutch to couple the engine with the motor responsive to a powertrain torque being outside the lash region.

11. The control system of claim 7, wherein operating the engine in the sailing mode includes controlling the engine to rotate at a speed equal to a motor speed.

12. The control system of claim 7, wherein the controller is further configured to exit the sailing mode through reengagement of the clutch responsive to a powertrain torque being outside the lash region.

13. A method for controlling a vehicle having an engine selectively coupled to a motor via a clutch, comprising:
in response to a vehicle wheel torque reversal, disengaging the clutch to disconnect the engine from the motor, controlling the engine to operate in a speed control mode, and controlling motor torque to reduce a powertrain torque at a predefined rate through a lash region surrounding the vehicle wheel torque reversal to reduce torque disturbances in a vehicle driveline.

14. The method of claim 13, wherein operation in the speed control mode includes controlling an engine speed to match that of a motor speed.

15. The method of claim 13, further comprising:
commanding the engine to exit the speed control mode responsive to the powertrain torque being outside the lash region.

16. The method of claim 13, wherein the vehicle wheel torque reversal is from positive to negative and triggered by an accelerator pedal tip out.

17. The method of claim 13, further comprising:
reengaging the clutch to couple the engine to the motor responsive to the powertrain torque being outside the lash region.

18. The method of claim 13, wherein the lash region is determined from motor operating parameters.

* * * * *